(12) United States Patent
Tetrick (10) Patent No.: US 6,250,664 B1
(45) Date of Patent: Jun. 26, 2001

(54) TRUCK HITCH MOUNTING FRAME (75) Inventor: James L. Tetrick, Washington, IL (US)

(73) Assignee: United Truck Parts LLC, Fort Wayne, IN (US)

( * ) Notice: Subject to any disclaimer, the term of this patent is extended or adjusted under 35 U.S.C. 154(b) by 0 days.

(21) Appl. No.: 09/664,254

(22) Filed: Sep. 18, 2000

Related U.S. Application Data (62) Division of application No. 09/232,390, filed on Jan. 15, 1999, now Pat. No. 6,139,042.

(51) Int. Cl.[7] .................................................... B60D 1/58
(52) U.S. Cl. ....................... 280/495; 280/491.5; 280/504
(58) Field of Search .................................. 280/495, 497, 280/500, 501, 490.1, 491.5, 456.1, 504

(56) References Cited

U.S. PATENT DOCUMENTS

| | | | |
|---|---|---|---|
| 2,465,641 | * 3/1949 | Gardner | 280/497 |
| 2,531,768 | * 11/1950 | Cline et al. | 280/497 |
| 3,768,837 | * 10/1973 | Reese | 280/495 |
| 4,204,701 | * 5/1980 | Oltrogge | 280/491.5 |
| 4,397,475 | * 8/1983 | Dietrich, Sr. et al. | 280/495 |
| 4,738,464 | * 4/1988 | Putnam | 280/500 |
| 5,306,037 | * 4/1994 | Robertson | 280/495 |
| 5,915,714 | * 6/1999 | Bell et al. | 280/456.1 |

* cited by examiner

Primary Examiner—Daniel G. DePumpo
(74) Attorney, Agent, or Firm—Emrich & Dithmar (57) ABSTRACT

A carrier frame for a spring cushion truck hitch includes first side mounting plates and a transverse load-resisting tube connected between the mounting plates. The stiffener extends laterally beyond the first plate and includes second side plates which connect the frame of the hitch to the truck frame, so that the carrier frame can be removed from the hitch and the hitch re-used on a different truck having a different frame configuration.

4 Claims, 11 Drawing Sheets

TRUCK HITCH MOUNTING FRAME

RELATED APPLICATION

This is a Divisional of application Ser. No. 09/232,390, filed Jan. 15, 1999 now U.S. Pat. No. 6,139,042.

FIELD OF INVENTION

The present invention relates to improvements in bumper hitch apparatus used primarily for smaller or light trucks, such as pick-up trucks. In particular, the improvements relate to extendable cushion hitches of the kind disclosed in Antic U.S. Pat. No. 3,140,881, issued Jul. 14, 1964; Dietrich, Sr., U.S. Pat. No. 4,265,465, issued May 5, 1981; and Dietrich, Sr., et al U.S. Pat. No. 4,397,475, issued Aug. 9, 1983.

BACKGROUND OF THE INVENTION

The type of small truck cushion hitch disclosed in the above patents has remained popular with purchasers and owners of small trucks, primarily pick-up trucks. The primary feature of this type of hitch is that the drawbar may be released from its locked position, and slid rearwardly and moved laterally to align the hitch member of the truck with the hitch member on the tongue of a trailer. After the hitch members are connected and the releases returned to their locked positions, the truck may be moved rearwardly and then forwardly to lock the drawbar of the hitch. During road travel, the drawbar member is spring-cushioned in the locked position, thereby providing a smoother ride and less load variation (i.e., shock load) on the transmission of the truck.

For the first few decades of its usage, the type of extendable cushion hitch with which the present invention is concerned was mounted to the truck frame using side brackets in a position immediately below the frame of the truck. In this case, the truck bumper was removed, and a replacement bumper, typically of universal application, was supplied as an integral unit with the hitch assembly.

With the proliferation of different sizes and styles of pick-up trucks, and the increasing number of domestic and foreign manufacturers of pick-up trucks for the U.S. market, and with the increasing sophistication of manufacturing techniques for increasing the strength of light truck vehicles, the frame configurations for light trucks have increased substantially. To have a uniquely designed cushion bumper hitch and mounting for each model of truck for every truck manufacturer would be prohibitive, particularly when it is realized that these types of products are not distributed directly from the manufacturer, but rather, they are distributed through dealers. Each dealer would have to stock an inordinately large number of hitch assemblies, each dedicated to one or a few truck models.

Moreover, manufacturers of small trucks, in an effort to increase their marketability to a larger number of customers, have adopted automotive styling features for the trucks. One such feature is the use of a rear bumper which is styled to match the truck and to curve around the rear corners. Further, bumpers of many such trucks are painted to match the color of the truck, as with passenger automobiles.

These automotive developments have created a number of problems for light truck owners desiring a heavy duty spring cushion bumper hitch. The first is that the bumper formerly sold with extendable cushion hitches does not match the color of the truck, and it is not styled in a rounded automotive design. Current purchasers of light trucks do not want to have their styled rear bumpers removed and replaced by a bumper which does not match the design and color of the truck they purchase.

If it is desired to place the bumper hitch beneath the original bumper of the truck, another mounting problem arises—namely, that by suspending the hitch assembly at a greater distance beneath the truck frame, greater forces are generated in the brackets which attach the hitch assembly frames to the truck frame since the hitch assembly is suspended beneath the frame at a greater distance than with bumper hitches which replace the rear bumper. This greater distance creates greater bending forces under load conditions on the brackets which attach the cushion bumper assembly to the vehicle frame.

SUMMARY OF THE INVENTION

The present invention is directed to a mounting structure for a conventional truck cushion hitch assembly in which the hitch assembly is mounted to the frame of the truck at a position below the original bumper of the truck by a weldment called a carrier frame. This permits the owner to retain the original bumper and avoids the cost of a replacement bumper.

Moreover, the present invention permits the manufacturer to make a standard or truly universal cushion hitch assembly which is used for all truck models. That is, there is no need to provide separate cushion hitch assemblies just to accommodate variations in truck frame configurations. The carrier frame is adapted to fit a large number of different truck frames so that only the standard hitch assembly and a few models of carrier frame need be stocked by the dealer.

The carrier frame includes first mounting brackets which are connected to the frame of the spring cushion hitch assembly, and second mounting brackets which are located, sized and spaced to connect to the frame of a number of truck frame configurations. The mounting brackets of the carrier frame are welded to a transverse structural member located above the hitch assembly and beneath the truck assembly to provide a solid, rigid mounting frame which is designed to withstand the increased lateral or torsion forces accompanying the mounting of the hitch assembly below the bumper of the truck.

Moreover, because each of the carrier frames themselves are of a "universal" nature, though not necessarily accommodating all truck frames because of the large number of truck frame configurations, only a limited number of mounting frames are required to be inventoried by a dealer. In other words, the dealer has in inventory, a larger number of identical cushion hitch assemblies, and a smaller number of seven separate carrier frames to accommodate up to sixteen different sizes and configurations of truck frames. Each carrier frame is then adapted to mount the hitch assembly to a large number of truck frame configurations. If new truck frame configurations are introduced, or if the existing ones are modified, only the carrier frame need be modified. The cushion hitch assembly remains the same. This saves cost for the manufacturer and reduces the time to design a model capable of accommodating the new truck frame configuration.

In summary, the present invention solves these two existing problems in that: (1) the cushion hitch assembly may be mounted beneath the truck bumper, leaving the original bumper in place and obviating the former need to purchase a replacement bumper; and (2) the same hitch assembly is adapted to a large number of truck frame configurations.

Each carrier frame includes a weldment of a transverse load-resisting bar and associated mounting brackets for receiving the hitch assembly and for mounting it to the truck frame. In a first illustrated embodiment of the invention, the mounting brackets of the carrier frame have sufficient length in the longitudinal direction (that is, in the fore-to-aft direction of the vehicle) that the forward mounting brackets are not required. Additional bracing brackets, adapted for mounting the forward end of the hitch assembly to a forward location on the truck frame may be provided if the application requires it, as in the second disclosed embodiment.

In the third illustrated embodiment, the carrier frame is adapted to a truck frame which is comparatively wide. In this embodiment, two separate transverse structural frame members are included in the mounting frame, one in a forward position, and one in a rearward position. The mounting brackets for the hitch assembly are separate and spaced at a narrower lateral spacing, and the mounting brackets for the truck frame are spaced at a wider lateral spacing to accommodate the additional width that is needed. Again, the transverse members and the mounting brackets are welded into a rigid carrier frame.

Other features and advantages of the present invention will be apparent to persons skilled in the art from the following detailed description of three different embodiments, accompanied by the accompanying drawing wherein corresponding reference numerals will refer to like parts in the various views, and in which the reference numerals for like structure in the second (FIGS. 6–8) and third (FIGS. 9–10) of the three illustrated embodiments of the carrier frame are respectively are in a 100 series and 200 series.

DETAILED DESCRIPTION OF THE ILLUSTRATED EMBODIMENTS

Conventional Hitch Apparatus

Figure 1:
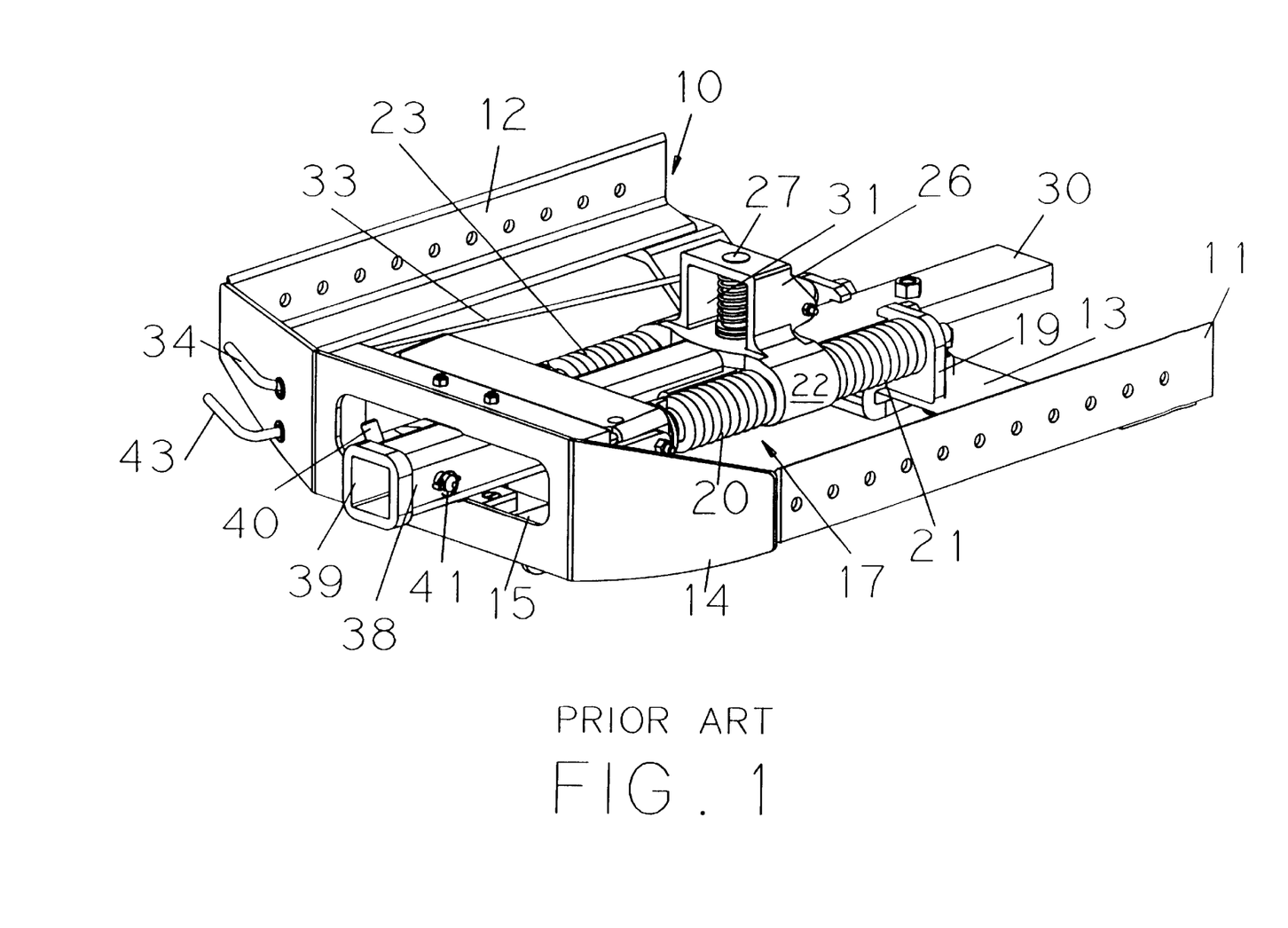
FIG. 1 is an upper, rear, right-side perspective of a standard cushion hitch assembly which is commercially available and known in the art.

Referring first to FIG. 1, there is shown a conventional spring cushion truck hitch assembly which is commercially available from DMI, Inc. of Goodfield, Ill., and is known in the art. Briefly, the hitch assembly includes a frame generally designated 10. The frame 10 includes a right-side angle frame member 11 and a left-side angle frame member 12. "Right" and "left" refer to the right side and left sides of the apparatus as viewed by an occupant of the vehicle, the front of the vehicle being toward the upper right-hand corner in FIG. 1.

Each of the side frame members 11, 12 is in the form of an angle, the vertical flange of the angle being apertured to receive mounting bolts. The bolt apertures are spaced in the fore-to-aft direction of the side frame members so that the hitch assembly may be mounted to a number of different carrier frames, as will be clear. The frame of the hitch assembly also includes a forward transverse frame member 13, and rear face plate 14 which contains a laterally-extending central aperture 15. A cushion spring assembly generally designated 17 is mounted to the frame 10 by means of a forward casting 19 which is bolted to the forward transverse frame member 13. The spring assembly includes a pair of right side coil springs 20, 21 which abut a central or intermediate casting 22, and a similar pair of left side coil springs 23, 24 which also abut the casting 22 and bias it to a central position in the longitudinal direction. The pairs of springs are mounted by bolts to the forward casting 19.

The intermediate casting 22 includes a housing in the form of an inverted "U" designated 26.

The upper end of a pin 27 is slidably received in an aperture in the top of the housing 26, and the lower end of the pin 27 extends through the center of the top of the casting 22 into a rectangular opening which receives a drawbar 30 of rectangular cross section. A spring 31 urges the pin 27 downwardly so that the lower end of the pin 27 enters into a vertically facing aperture formed in the drawbar 30. The pin 27 prevents the drawbar from sliding fore-and-aft. The drawbar 30, however, is permitted to slide fore-and-aft when the pin 27 is raised by means of a lever actuated by a formed rod 33 which has a handle 34 extending out the left side of the rear face plate 14. The forward end of the formed rod 33 actuates a lever, see 36 in FIG. 2, which is pivotally mounted at 37 to the intermediate casting 22 so that when the handle 34 is pulled rearwardly, the lever 36 rotates counterclockwise about pin 27, as viewed from the left (see FIG. 6) thereby raising the pin 27 to disengage the drawbar 30.

A tubular draw member 38 is mounted to the rear of the drawbar 30. Draw member 38 has a rectangular opening 39 (FIG. 1) forming a receptacle for a hitch. The tubular member 38 is known as a Reese hitch, and the hitch of the truck is secured to the tubular draw member 38 by means of a pin 40 which is conventionally secured by a hairpin or cotter pin 41 at a location rearward of the faceplate 14. As is known, the hitch members of the towing vehicle and the towed vehicle extend along the fore-to-aft center line of the vehicles as the center line of the hitch assembly.

Figure 2:
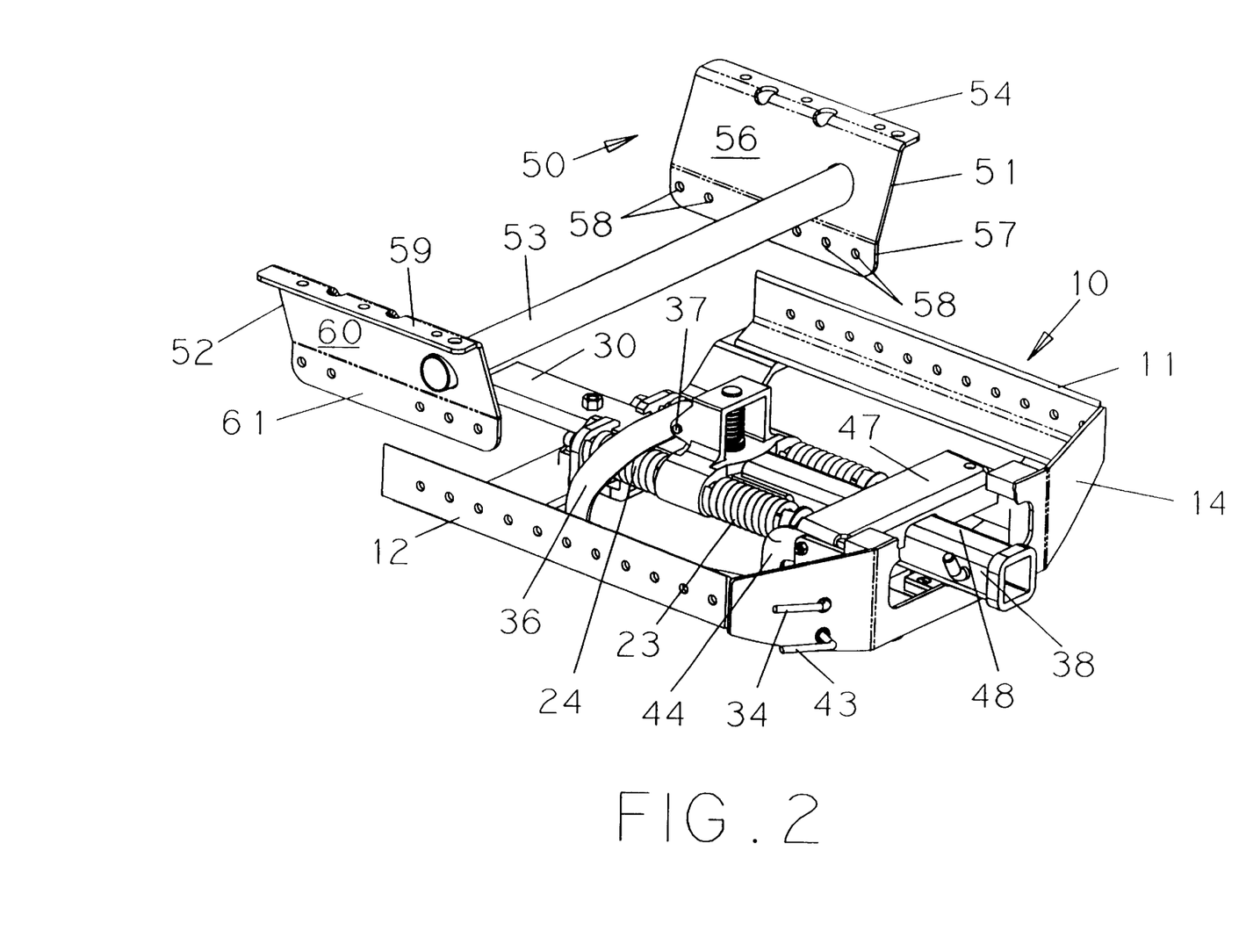
FIG. 2 is perspective view of a first embodiment of the invention with the hitch assembly and carrier frame spaced apart.
Figure 3:
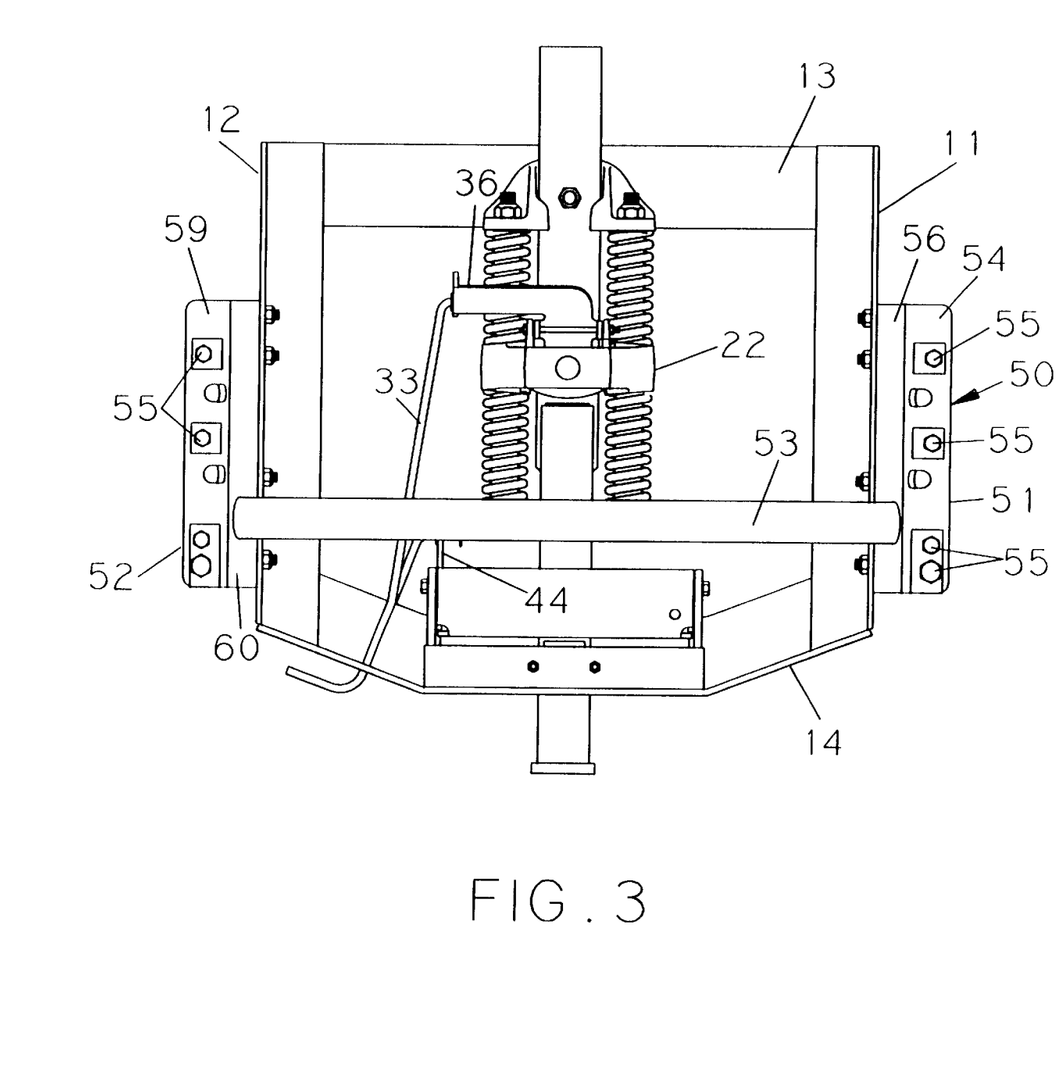
FIG. 3 is a top view of the embodiment of FIG. 2 with the carrier frame assembled to the hitch assembly.

A second formed rod 43 located beneath the rod 34 includes a handle rearward of the face plate 14, and extends forwardly to a lever 44 (FIG. 3). The lever 44 is pivoted at a location immediately forward of the rear face plate 14 to raise a stop lock member 47 which is spring-biased to the lock position and notched at 48 as can be seen in FIG. 2 to secure the tubular drawbar member 38 and prevent it from moving laterally while permitting it to slide longitudinally. When the rod 43 is pulled, the lever 44 pivots counterclockwise when viewed from the left to raise the stop lock 47 and permit the tubular drawbar member 38 to be moved laterally.

Thus, the draw member 38 can be moved freely fore-and-aft of the spring assembly when the rod 34 is pulled, and can be moved laterally when the rod 43 is pulled.

After the hitches of the truck and trailer are secured to each other, the operator of the vehicle can move the vehicle rearwardly so that the stop lock 47 will secure the drawbar members in a center position. This aligns the spring-biased pin 27 through the center of the rectangular drawbar 30 and the pin will enter the aperture in the rectangular drawbar as the vehicle slows or stops, causing the trailer to move forwardly. When the stop lock member 47 is released, as the vehicle moves laterally during towing, the lock member 47 will again secure the tubular draw member 38 in the center position.

Figure 4:
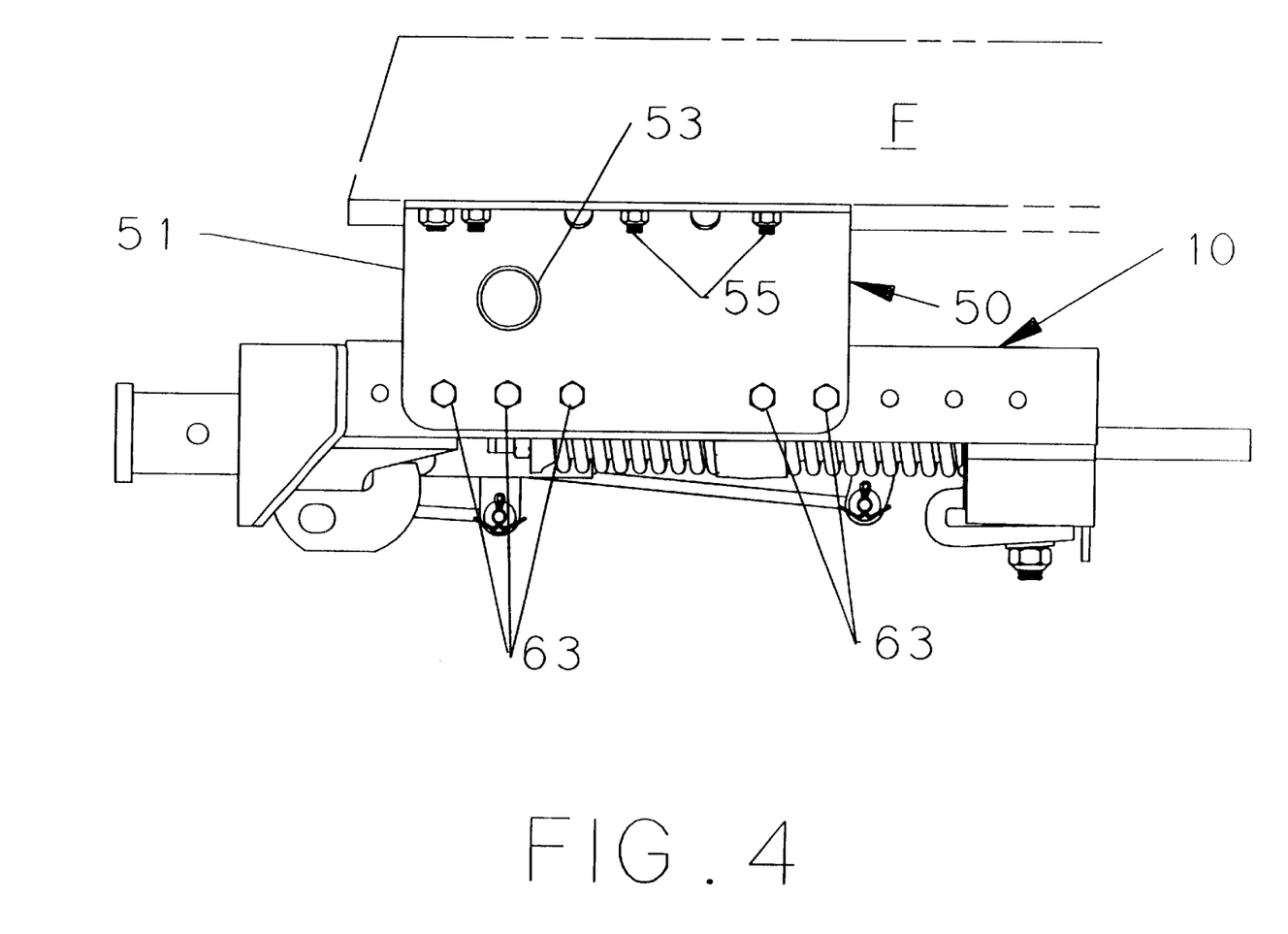
FIG. 4 is a right-side view of the apparatus of FIG. 2 with the frame of a truck shown in chain line.
Figure 5:
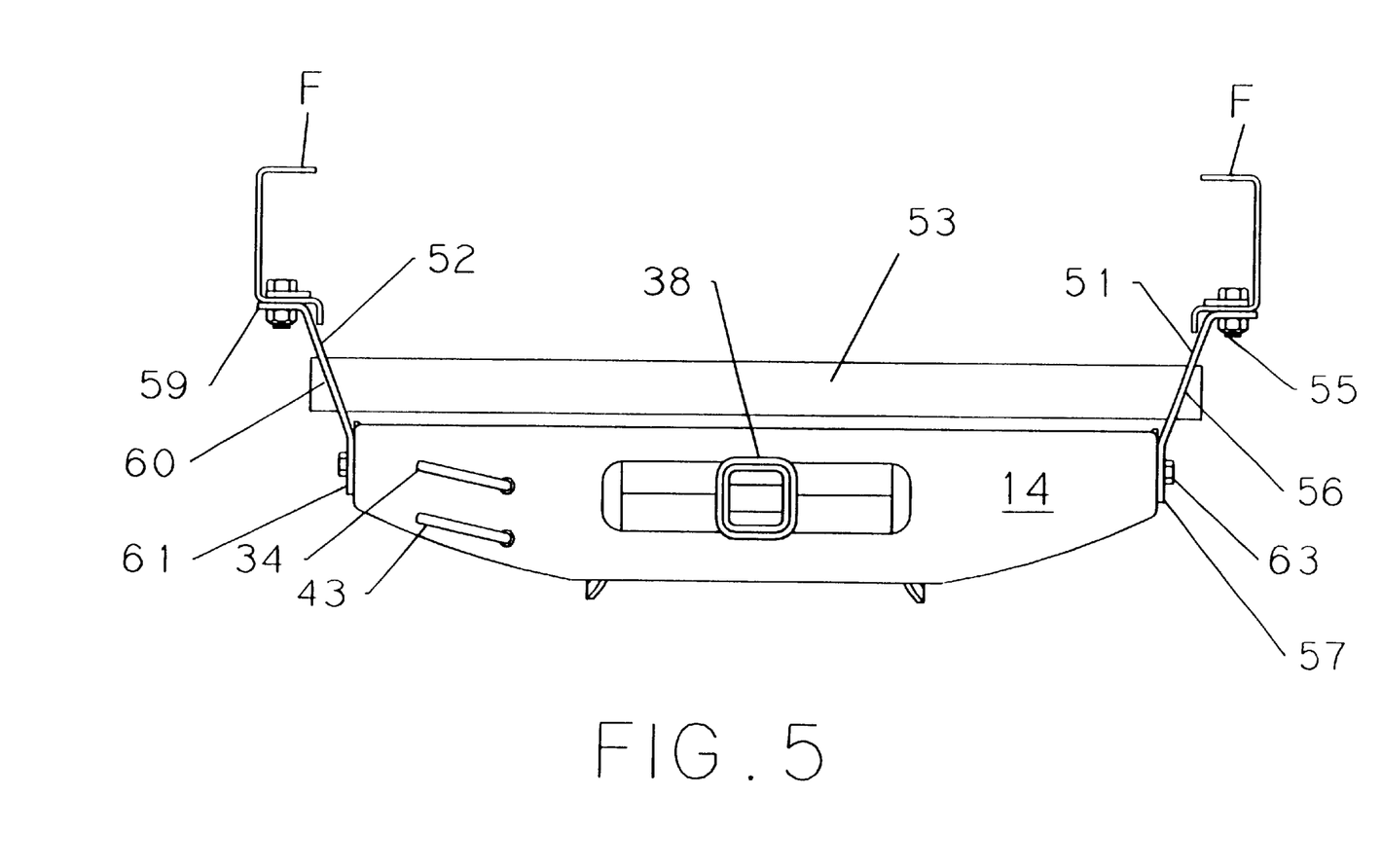
FIG. 5 is rear view of the apparatus of FIG. 2.

Turning now to FIG. 2, a cushion hitch assembly, as shown in FIG. 1 and described above, is again designated 10. A carrier frame for the hitch assembly 10 is generally designated 50. It includes a right side mounting bracket or flange 51 and a left side mounting bracket 52 which is a mirror image of the right side mounting bracket. The right mounting bracket 51 and left mounting bracket 52 are rigidly secured together by being welded to a transverse structural load bearing member 53, in this embodiment in the form of a tube of circular cross section, although other tubular configurations such as square or rectangular may be used. The right side mounting bracket 51 includes an upper horizontal mounting flange 54 which is apertured be mounted by bolts (see 55 in FIG. 3) to the frame F of the vehicle, an intermediate web 56 which is inclined so as to adapt the narrower spacing of the side frame members of the hitch assembly to the wider spacing of the truck frame members, and a lower vertical mounting flange 57 which contains a series of longitudinally spaced apertures 58 spaced in a fore-and-aft direction for mounting to the upright portion of the right side frame member 11 of the hitch assembly. The apertures of the lower flanges 57, 61 are used to secure the hitch assembly to the carrier frame by means of bolts 63 (FIG. 4). The left side mounting bracket 52 of the carrier frame includes a similar upper horizontal apertured mounting flange 59, intermediate web 60 and apertured lower vertical mounting flange 61. The transverse structural load-bearing member 53 is welded to the intermediate webs 56, 60 of the right- and left-hand mounting brackets 51, 52.

Figure 6:
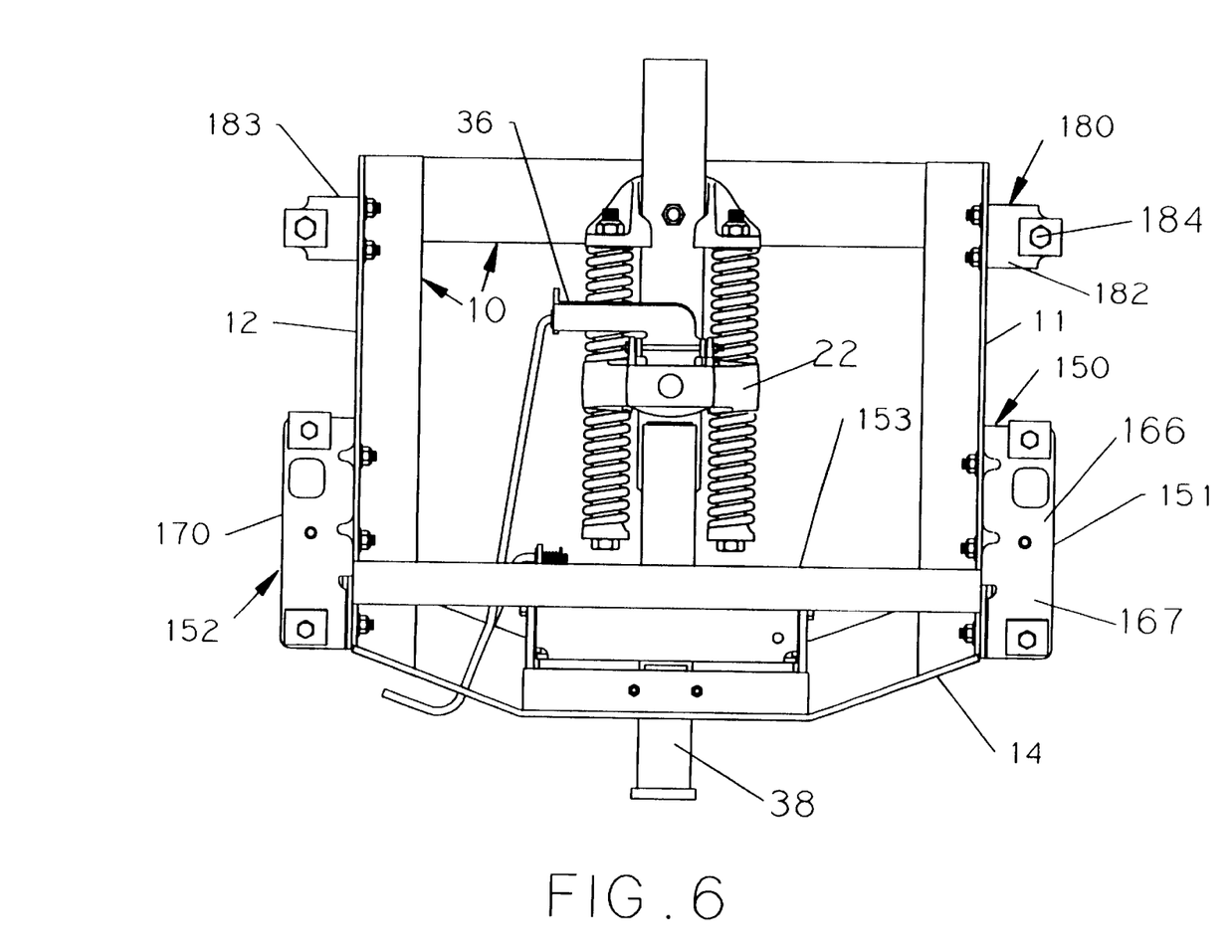
FIG. 6 is a top view of an alternative the embodiment with the carrier and conventional hitch assembly in assembled relation.
Figure 7:
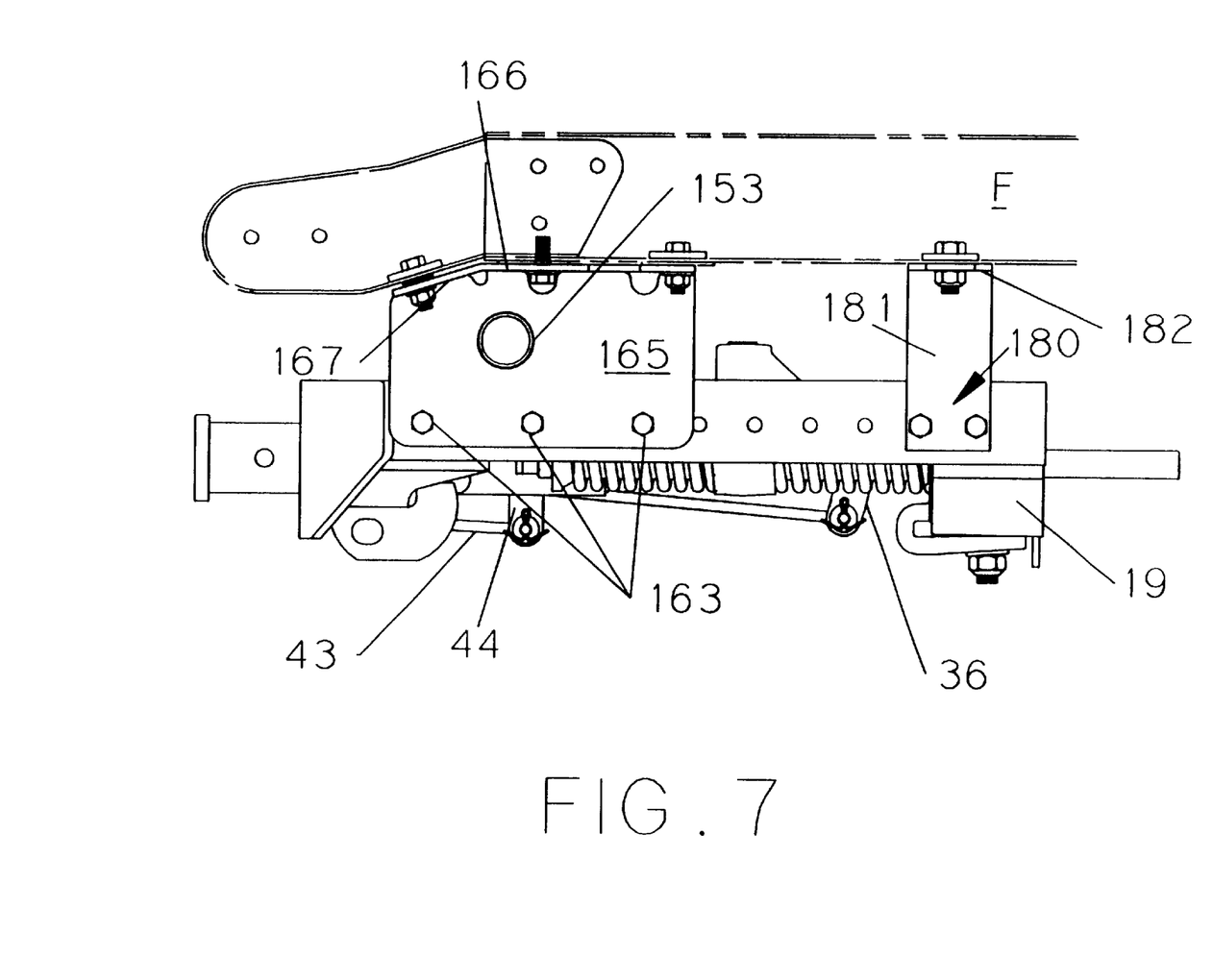
FIG. 7 is a right-side view of the apparatus of FIG. 6 with the frame of a truck shown in chain line.
Figure 8:
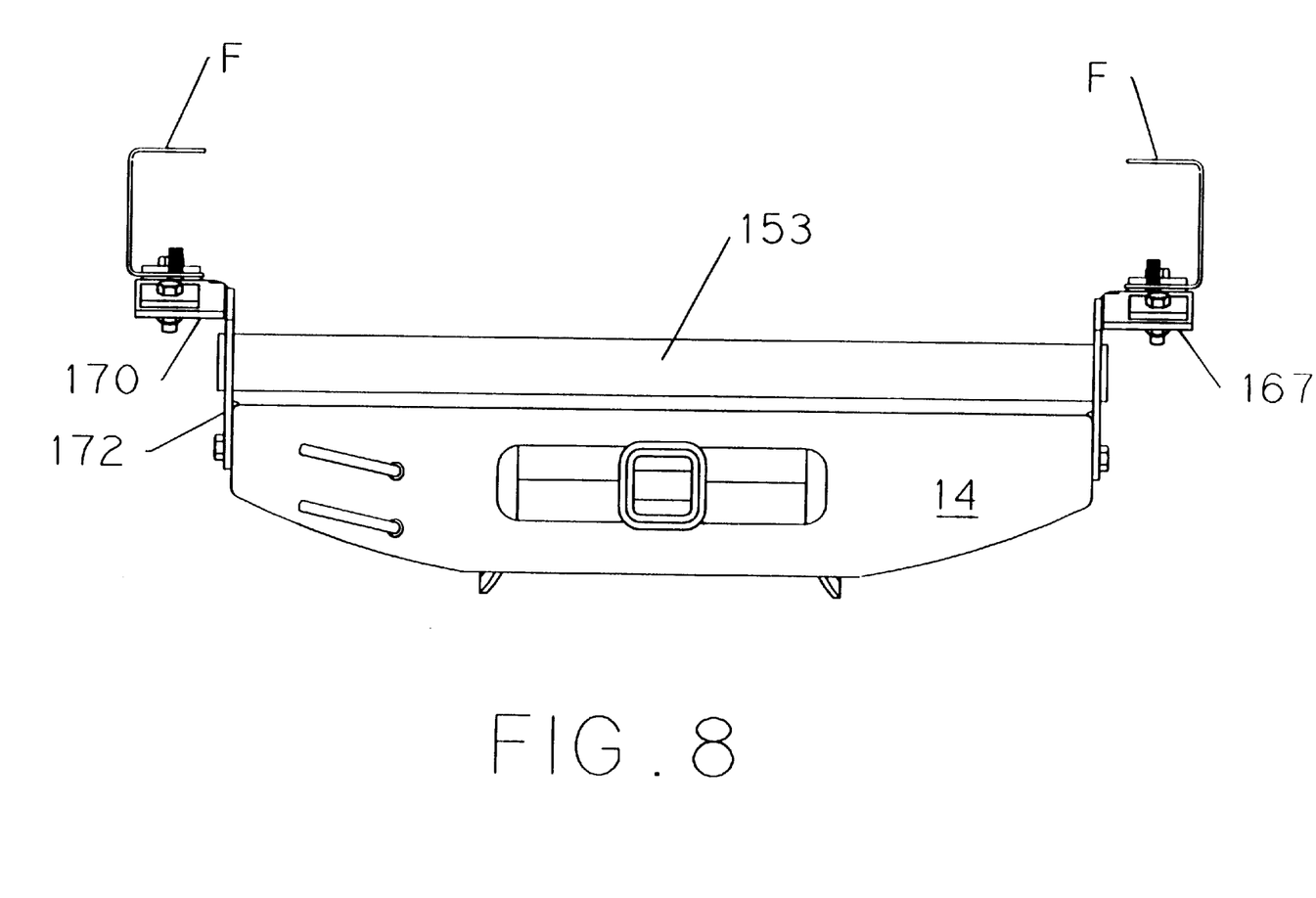
FIG. 8 is rear view of the second embodiment of FIG. 6.

Turning now to the embodiment of FIGS. 6–8, the hitch assembly 10 is the same as that described above. The carrier frame is generally designated 150, and it includes a right and left side mounting brackets 151, 152 welded to a transverse tubular structural load-bearing member 153.

The right side mounting bracket 151 includes a vertical mounting flange 165 (FIG. 7) and an upper and a horizontal flange 166. The vertical mounting flange 165 is bolted to the right side frame member 11 of the hitch assembly frame by bolts 163, and the horizontal mounting flange 166 is bolted to the frame of the truck. Similarly, the left side mounting bracket 152 includes a horizontal mounting flange 170 adapted to be secured to the frame F of a vehicle, and a vertical mounting flange 172 (FIG. 8) which is bolted to the frame 12 of the cushion hitch assembly 10.

In the embodiment of FIGS. 6–8, a pair of forward mounting brackets are also provided, including a right side forward L-shaped mounting bracket 180 which has a vertical flange 181 secured to the forward portion of the side frame member 11 of the hitch assembly by a bolt 184, and a horizontal upper mounting flange 182 bolted to the frame F of the vehicle. A left side forward mounting bracket 183 similar to bracket 180 secures the forward end of the left side frame member 12 of the hitch assembly to the frame F of the vehicle. In the embodiment of FIGS. 6–8, the carrier frame is again a rigid weldment so that side forces caused by pulling a trailer are resisted by the transverse load-bearing member 153, and the forward mounting brackets 180, 183 stabilize the forward end of the frame 10 of the hitch assembly against the vehicle frame.

Figure 9:
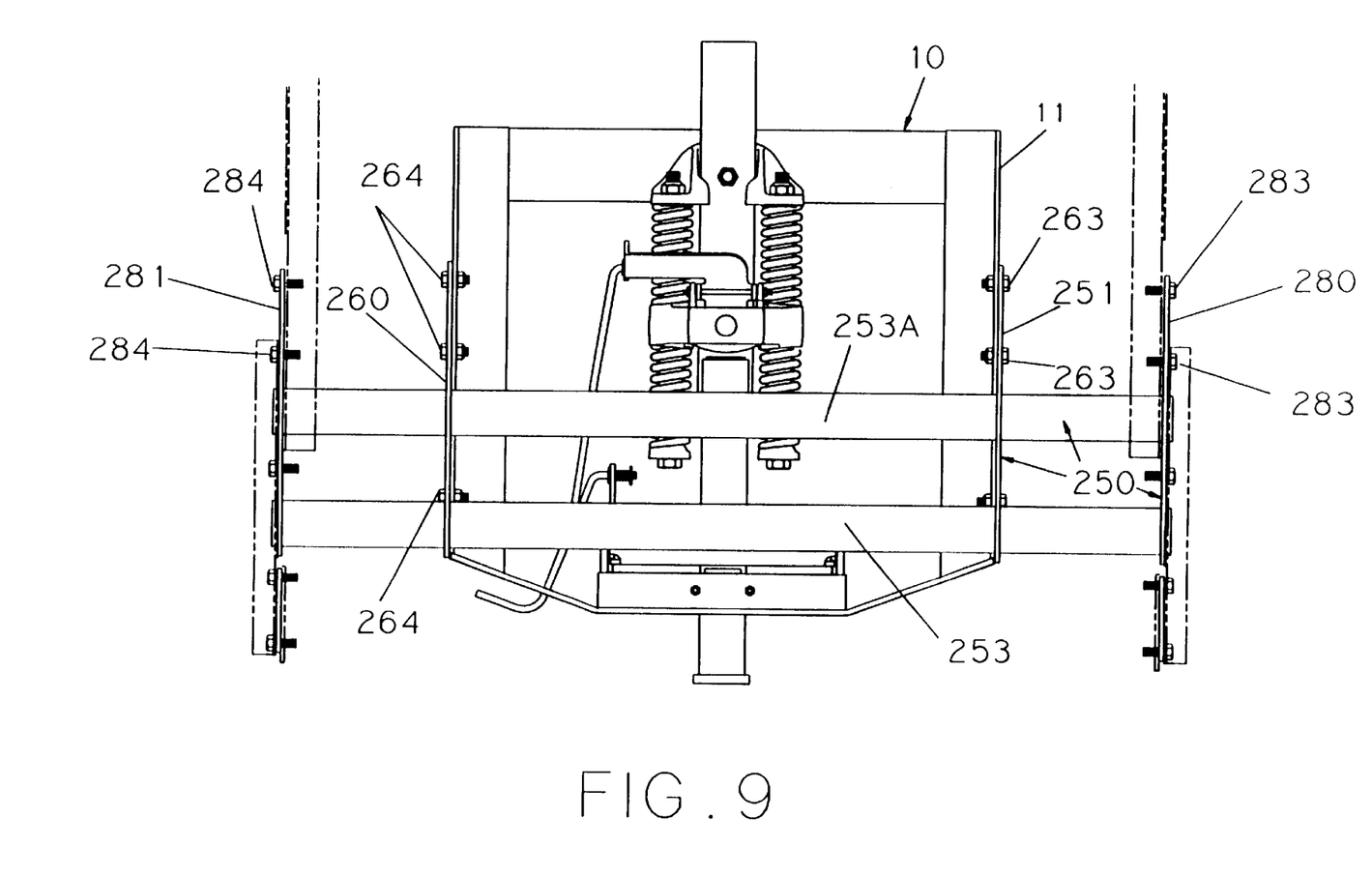
FIG. 9 is a top view of a third embodiment of the invention.
Figure 10:
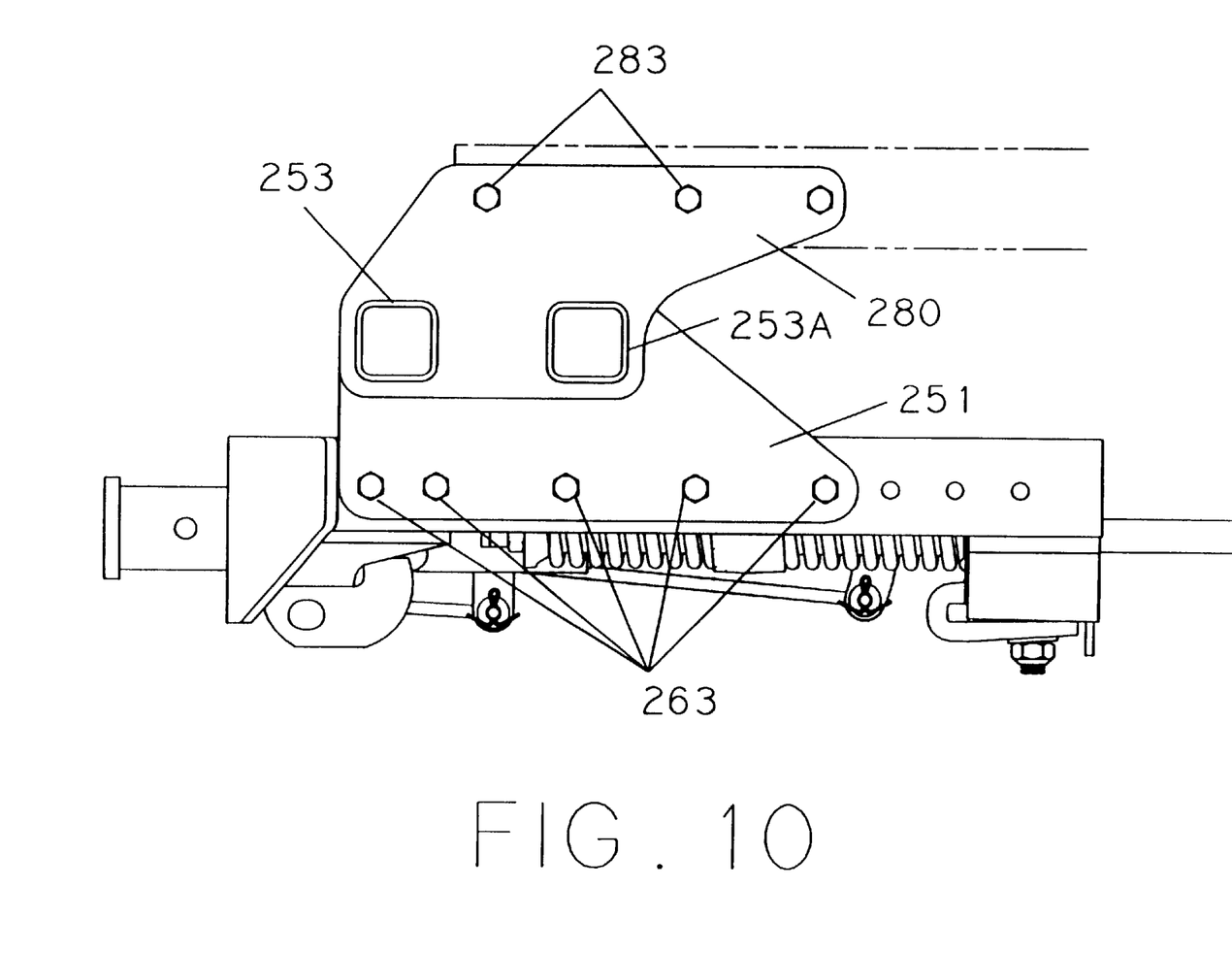
FIG. 10 is a right-side view of the apparatus of FIG. 9 with the frame of a truck shown in chain line.
Figure 11:
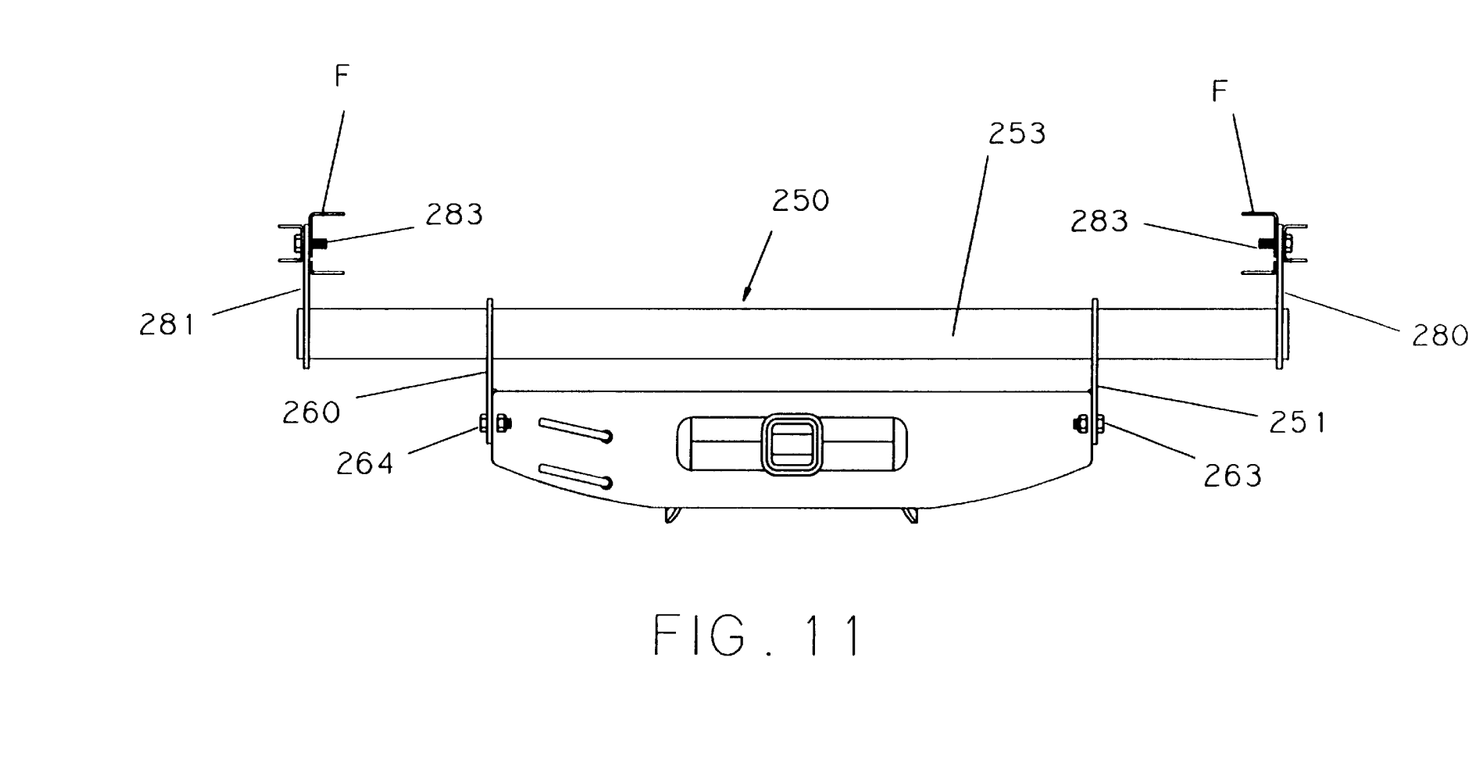
FIG. 11 is rear view of the apparatus of FIG. 9.

Turning now to the embodiment of FIGS. 9–11, again the cushion hitch assembly is generally designated 10, with side frame members 11, 12. Thus, the carrier frame is generally designated 250, and it is adapted for a vehicle frame wherein the longitudinal frame members of the vehicle F, F (FIG. 11) are spaced at a wider spacing than in the two embodiments discussed above. In order to accommodate this wider spacing of the vehicle frame members, the carrier frame 250 includes a pair of inner mounting plates 251, 260. These two mounting plates are flat plates, and they are secured by bolts 263, 264 respectively to the upright portions of the side frame members 11, 12 of the hitch frame. The mounting plates 251, 260 are welded to two transverse load-bearing members, 253 and 253A. The tubular frame members 253, 253A are rectangular with rounded corners, as seen in FIG. 10.

The transverse structural load-bearing members 253, 253A of the embodiment of FIGS. 9–11 extend laterally beyond the side frame members of the hitch assembly to accommodate the extra spacing of the truck frame members F, F. The outboard ends of the transverse load-bearing members 253, 253A are welded to vertical mounting plates 280, 281 which are spaced and secured by bolts 283, 284 respectively to the outer lateral surface of the frame members F, seen best in FIGS. 9 and 10. The two transverse structural load-bearing members 353, 353A form a more rigid carrier frame to accommodate the greater bending loads exerted by pulling loads where the frame members F, F of the vehicle frame are spaced more widely apart.

It has been found that with the three carrier frames of the type disclosed in the instant application, a majority of all the pick-up truck frames currently on sale in the U.S. can accommodate a standard hitch assembly of the type disclosed. This permits the dealer to stock a larger number of hitch assemblies, all of a standard configuration and dimension, and a smaller number of different configurations of carrier frame, each configuration of carrier frame being suitably sized and adapted for a number of vehicle frames, but not all vehicle frames. Each carrier frame is adapted to a number of vehicle frames because of the spacing of the apertures in the side mounting plates which are bolted to the vehicle frame.

The invention permits a vehicle owner, when he or she sells the vehicle, to remove the carrier frame and the hitch assembly (or just the hitch assembly, if desired) and to mount the hitch assembly on a new vehicle of different manufacture or style by simply purchasing a new carrier frame. For some different vehicle models the same carrier frame will accommodate the hitch assembly so it is not necessary to buy a new carrier frame.

In all cases, however, by having the carrier frame include right and left side mounting brackets or plates and at least one transverse structural load-bearing member rigidly mounted to the mounting brackets or plates, it is also permissible to mount the hitch assembly a greater distance below the vehicle frame but with the transverse structural load-bearing members located between the hitch assembly and the vehicle frame, and at a distance below the vehicle frame such that the drawbar is located beneath the original bumper of the vehicle so that the original bumper need not be removed.

When the load being pulled is not centered on the longitudinal fore-to-aft center line (extending along the axis of the drawbar 30 and draw member 38 of the first embodiment), the load exerts a force tending to twist or turn the hitch assembly about a vertical axis. This twisting force has a greater effect on the mounting brackets of the carrier frame, the lower hitch assembly is mounted; and the force is resisted by the transverse members 53, 153 and 253, 253A in the three illustrated embodiments.

Persons skilled in the art will appreciate that other structural stiffener members may be substituted for the tubular members illustrated in the drawing, although they may not be as economical as the tubular members shown. For example, rods or various channels could be substituted for the tubular transverse stiffeners described herein.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In combination, a hitch assembly including a draw member carried by a hitch frame including first and second side frame members, each side frame member having an upright portion with a plurality of mounting apertures spaced in the fore-to-aft direction when said hitch assembly is mounted to the frame of a vehicle having a rear bumper; and a carrier frame adapted to mount said hitch assembly to the frame of said vehicle, said carrier frame comprising:

first and second side mounting plates, each side mounting plate including a plurality of apertures spaced in said fore-to-aft direction and adapted to be bolted to an associated one of said first and second frame members of said hitch frame, each of said first and second mounting plates having a sufficient vertical extension such that when said carrier frame is assembled to said vehicle frame to mount said hitch assembly, said draw member thereof is located below said rear bumper of said vehicle;

at least one transverse structural member extending between and connected to said first and second mounting plates, said structural member extending laterally beyond said first and second mounting plates; and third and fourth mounting plates connected to said transverse structural member and each defining mounting apertures for connection to said vehicle frame, said third and fourth mounting plates being spaced laterally outside said first and second mounting plates, respectively, said transverse structural member being constructed and arranged to resist lateral loads.

2. The apparatus of claim 1 further comprising a second transverse structural member fixed to said first and second mounting plates and to said third and fourth mounting plates.

3. The apparatus of claim 2 wherein said first and second transverse mounting members are tubular.

4. The apparatus of claim 3 wherein said transverse mounting members are rectangular in cross section.

* * * * *